Figure 1:
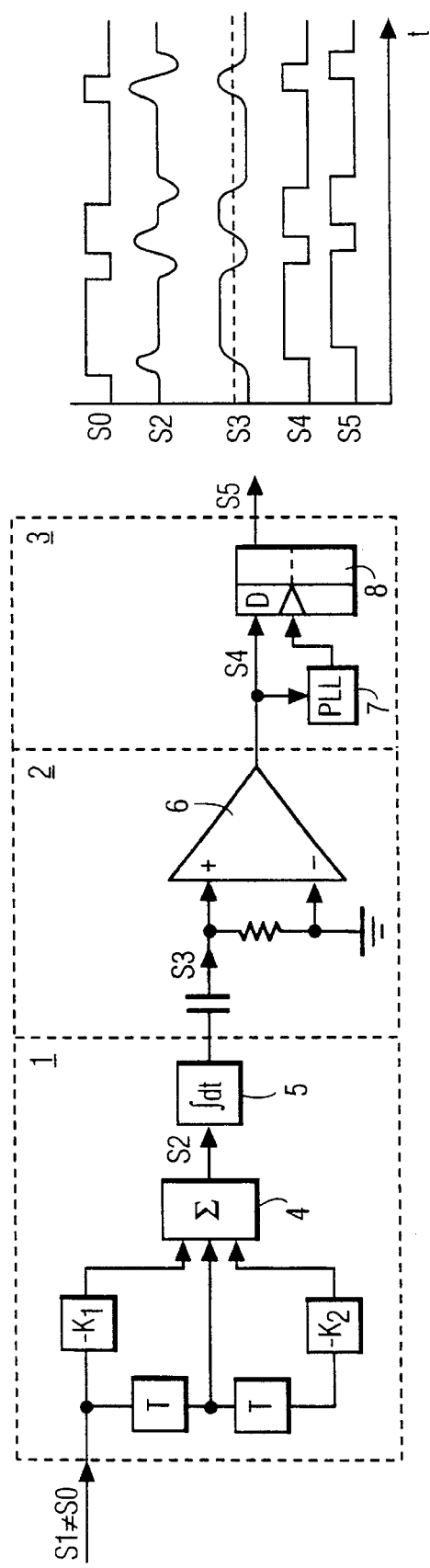

United States Patent [19]
Scholz

[11] Patent Number: 5,602,871
[45] Date of Patent: Feb. 11, 1997

[54] SIGNAL REGENERATOR FOR BINARY SIGNALS

[75] Inventor: Werner Scholz, Gehrden, Germany

[73] Assignee: Deutsche Thomson Brandt GmbH, Villingen-Schwenningen, Germany

[21] Appl. No.: 152,642

[22] Filed: Nov. 16, 1993

[30] Foreign Application Priority Data

Nov. 24, 1992 [DE] Germany .................. 42 39 374.4

[51] Int. Cl.$^6$ ........................................... H03H 7/30
[52] U.S. Cl. ...................... 375/233; 375/211; 375/214; 375/232
[58] Field of Search ..................... 375/211, 214, 375/229, 232, 233, 317, 318

[56] References Cited

U.S. PATENT DOCUMENTS

| 4,061,978 | 12/1977 | Motley et al. | 375/232 |
| 4,430,744 | 2/1984 | Johnson | 375/232 |
| 4,847,864 | 7/1989 | Cupo | 375/232 |
| 4,905,254 | 2/1990 | Bergmans | 375/233 |
| 5,181,228 | 1/1993 | Takatori | 375/233 |

FOREIGN PATENT DOCUMENTS 0073400 8/1982 European Pat. Off. .......... H04B 3/36

OTHER PUBLICATIONS

IEEE Transactions on Consumer Electronics, vol. CE-32, No. 4 Nov. 1986, pp. 707–712, Magnetic Recording Characteristics Of R-DAT.

Nachrichtentech, Elektron, Berlin 34 (1984) 10 pp. 371–375 Automatischer Langenausgleich bei PCM-Ubertragung auf Kabeln.

*Primary Examiner*—Edward L. Coles, Sr.
*Assistant Examiner*—Thomas L. Stoll
*Attorney, Agent, or Firm*—Joseph S. Tripoli; Frederick A. Wein

[57] ABSTRACT

A signal regenerator for binary signals includes a signal equalizer having an input filter and an integrator. An amplitude detector and a period detector are arranged to receive the output signal of the equalizer. A high pass filter is included in a feedback loop to feed the output signal of one of the detectors back to the equalizer.

4 Claims, 3 Drawing Sheets

SIGNAL REGENERATOR FOR BINARY SIGNALS

This invention is directed to a signal generator for binary signals.

The regeneration of a binary signal furnished by a transmission link, especially from a recording device, generally occurs in 3 stages:
1. signal equaliser
2. amplitude detector
3. period detector.

An equalising circuit which re-establishes the recorded binary signal (full-response equaliser) is known for example from IEEE Transactions, Vol CE-32, No. 4, Nov 1986, P 709, FIG. 7. The equaliser illustrated there comprises a so-called cosine equaliser and an integrator. The circuit is well suited for signals which are not only free of direct current but which also contain as few low frequency spectral components as possible. Such a signal is the 8/10 code for the R-DAT system for example.

Low redundancy codes e.g. 8/9 modulation or 24/25 modulation must be used for the digital video recording. The recorded signals generated with this modulation, which may contain additional items of tracking information, are of course free of direct current but possess very pronounced low frequency spectral components. The known equalising method, with which one strives to re-establish the original binary signal prior to the amplitude detection, is no longer to be recommended here. The low frequencies have to be very strongly emphasised in order to achieve the necessary eye opening. Thereby however, the low frequency interference signals are also intensified. Moreover, with too great a time constant of integration, the stability of the integrator can no longer be guaranteed.

In order to avoid these difficulties, the previously described method of equalisation, which is also referred to as full-response equalisation, is replaced by the partial response equalisation. Thereby, the equalising circuit produces an exactly defined distortion. Since the laws, to which signals generated in this manner adhere, are known, the original binary signal can be re-established with the help of suitable circuits. For the magnetic tape transmission, the so-called partial response Class 4 equalisation PR4 in combination with a maximum likelihood detector, usually of the Viterbi type, has proved to be particularly suitable. The PR4 signal is a ternary signal for which the level detection can no longer be effected with a simple zero crossing detector. In order to undertake the maximum likelihood detection, the PR4 signal has to be sampled with an A/D converter. The regeneration of the binary signal carried out in this manner requires a very large outlay compared to the regenerating circuit incorporating full-response equalisation and a zero crossing detector.

The object of the invention is to improve the regenerating circuit using full-response equalisation with the least possible additional expenditure such that it is also suitable for low redundancy transmission codes. This object is achieved by the invention described herein. Advantageous developments of the invention are specified in the appendant claims.

The solution to the problem is based on the principle of quantised feedback. Thereby, the input signal is passed as a high pass signal via a summing stage to the level detector. The output signal of the level detector or of the period detector is supplied to the second input of the summing stage via a low pass filter which should, if possible, possess the complementary frequency response to the high pass type transmission path of the input signal. Thereby, the low frequency signal components lost during the transmission are replaced from the signal that has already been freed from disturbances so that the emphasis of the lower frequency disturbances is avoided. In EP-PS 0 073 400, the complementary low pass signal required for the quantised feedback is produced in that the input signal transmitted over the high pass path is subtracted from the output signal of the detector.

The common ground between the quantised feedback and the invention consists in that a portion of the signal that has been freed from disturbances after one of the detectors is fed back into the signal prior to the amplitude detector. However, in contrast to the quantised feedback, the dc component of the signal is not fed back and thus is also not produced again in the circuit in accordance with the invention. Consequently, the circuit in accordance with the invention is suited above all for signals that may indeed contain large low frequency spectral components but which however are free of direct currents. The advantage of the circuit in accordance with the invention consists in that the proven concept of the full-response equalisation using an integrator can now also be utilised for signals having large low frequency spectral components. The integration can be carried out such that the emphasis of lower frequency disturbances is not too great and a good stability of the integrating circuit is ensured. An R-C series circuit has proved to be good as the feedback high pass filter. The eye opening of the signal at the input of the level detector can be optimised by setting the time constant of the R-C element and the feedback amplitude. This is synonymous with a minimising of the error bit rate of the regenerated signal.

The outlay for the improved circuit in accordance with the invention consists, in the simplest case, of a resistor and a capacitor. This simple solution is appropriate when one only has to reckon with small changes of the input amplitude. Insofar as a large fluctuation of the input amplitude is to be expected, the feedback amplitude should be automatically matched to the instantaneous input amplitude. Since a binary signal is fed back via the high pass filter, the amplitude adjustment of the feedback signal can occur by means of a limiter controlled by the amplitude of the input signal. The control voltage required by the limiter is generated by rectification of the input signal. Thereby, the advantage of the amplitude independence of the circuit, which is provided by the full-response equalisation in combination with the zero crossing detector as a level detector, is retained.

The invention will be explained hereinafter with the help of the drawings. Therein FIG. 1 shows a known regenerating circuit, FIG. 2 a regenerating circuit in accordance with the invention and FIG. 3 the implementation of a regenerating circuit in accordance with the invention.

FIG. 1 shows a known regenerating circuit having a full-response equaliser. The equaliser 1 consists of a so-called cosine equaliser and an integrator 5. In the cosine equaliser, the input signal is supplied three times, with respective transit time differences of one bit duration T, to the inputs of a summing stage 4. The co-efficients K1 and K2 are chosen such that the output signal S2 of the summing stage 4 consists of narrow pulses which correspond to the level transitions of the original signal S0 and which are, insofar as possible, free of any influences from the adjacent pulses. The signal S3, which is supplied to the level detector 2, is obtained from the pulses S2 by integration. The level detection is effected here by means of a comparator 6 connected as a zero crossing detector. Thereafter, the period detection is carried out by means of the bit rate regenerated in a PLL circuit 7 and a D type flip-flop 8 in the period detector 3.

Figure 2:
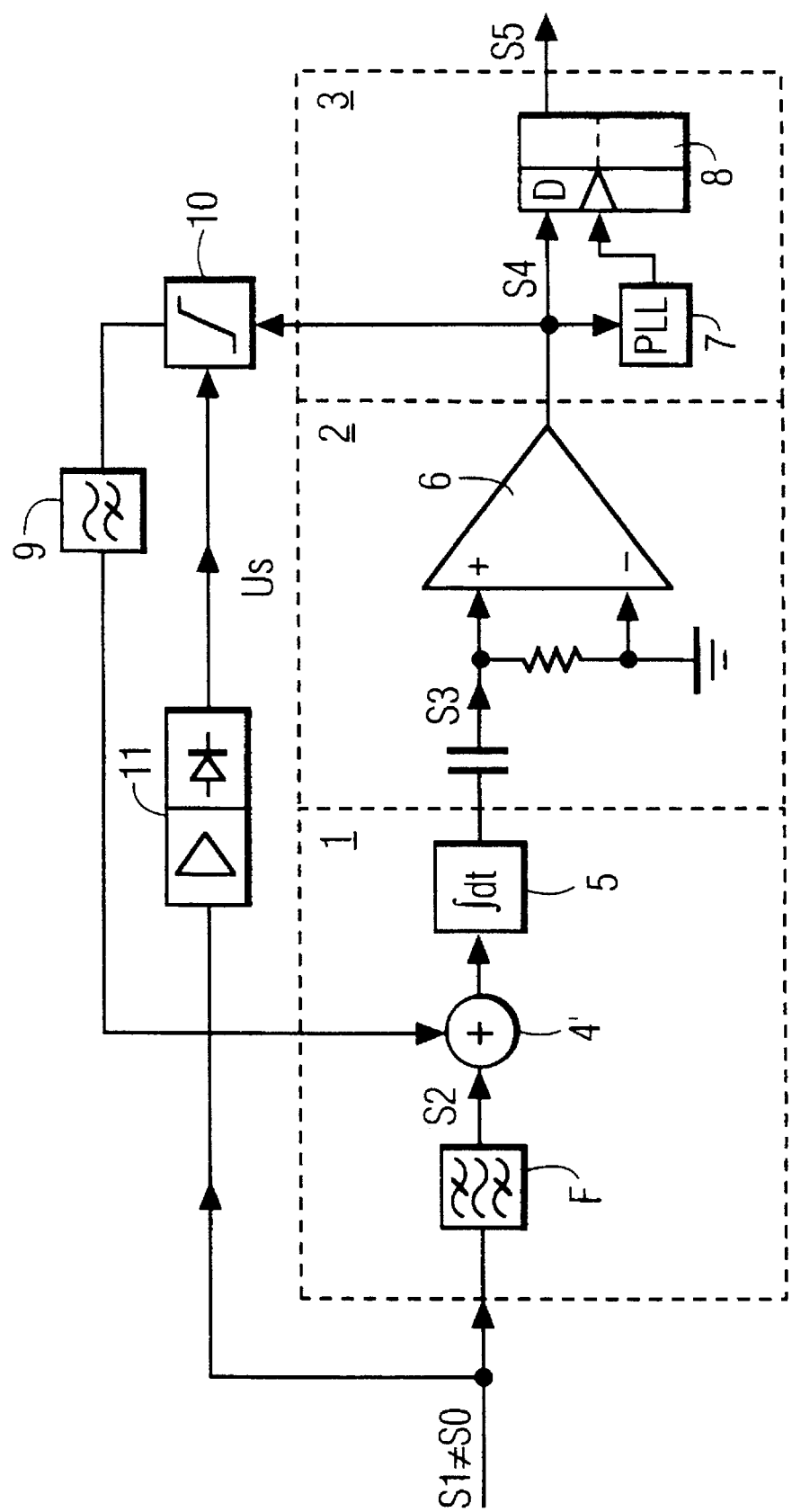

FIG. 2 shows a circuit in accordance with the invention. The signal equaliser 1 consists of an input filter F, a summing stage 4' and an integrator 5. If the input filter F is a transversal filter, the summing stage 4' may be a component of this filter as in FIG. 1. The output signal of the limiter 10 is supplied to the second input of the summing stage 4' via the high pass filter 9. The control voltage Us required for the limiter is generated by the amplifier 11 and the subsequent rectifier. The amplitude detector 2 is formed by the comparator 6 connected as a zero crossing detector. The output signal of the amplitude detector 2 is supplied to the period detector 3 and, moreover, is fed back via the controllable limiter 10 and the high pass filter 9 to the signal path located prior to the integrator 5. The period detection is carried out with the bit rate regenerated in a PLL circuit 7 and a D type flip flop 8 in the period detector 3.

Since a binary signal is fed back via the high pass filter 9, the amplitude adjustment of the binary signal can be effected by a limiter 10 controlled by the amplitude of the input signal S1. For large fluctuations of the input amplitude, the feedback amplitude is thus automatically matched to the instantaneous input amplitude. Thereby, the advantage of the amplitude independence of the circuit, which is provided by the full-response equalisation in combination with the zero crossing detector as a level detector, is retained.

Figure 3:
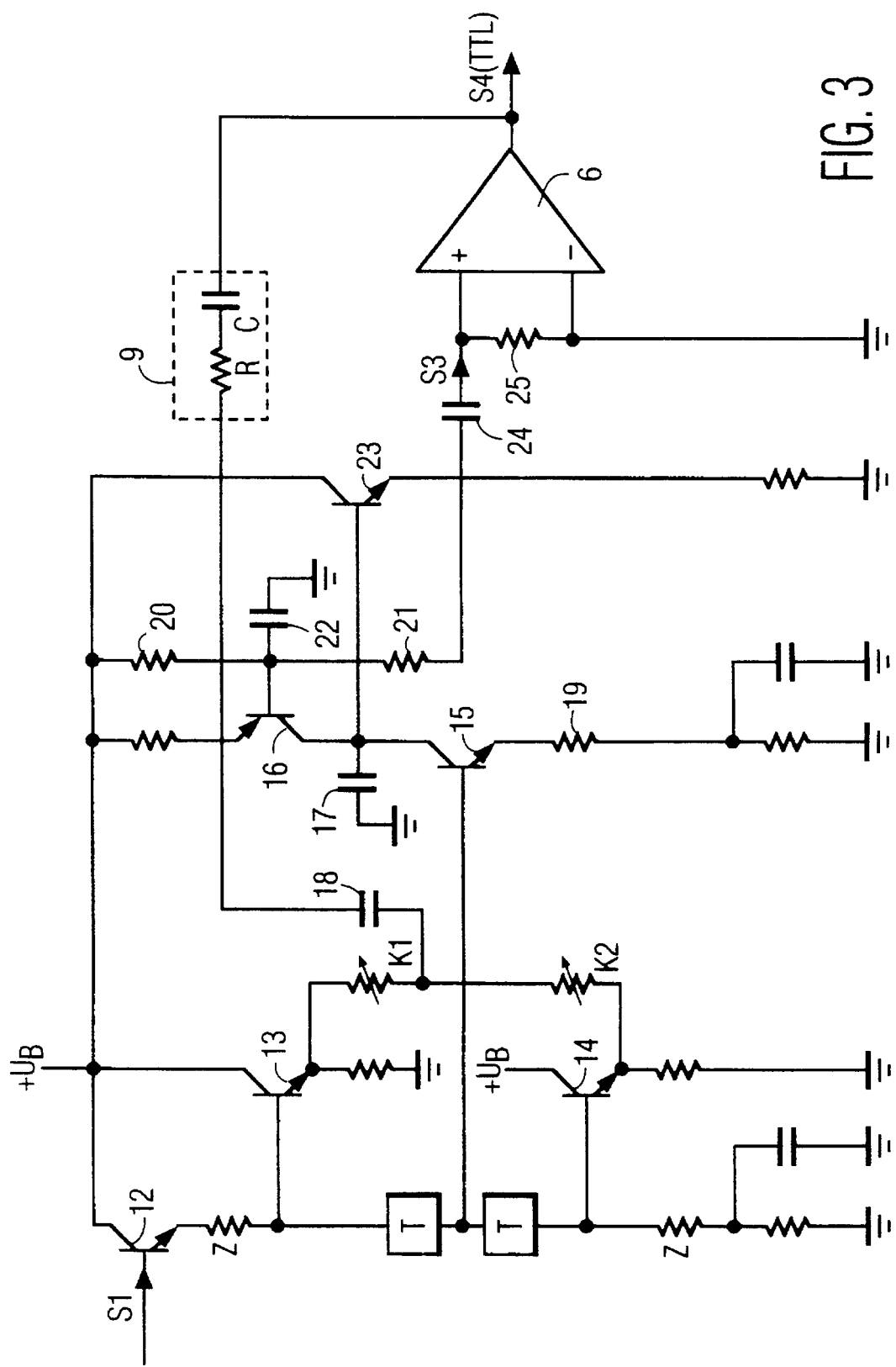

FIG. 3 shows a complete example of a circuit for the application of the described feedback. The input signal S1 is supplied via the emitter follower 12 to two delay lines each having a delay time of one bit duration T. The delay path is terminated at the input and the output by the characteristic impedance Z of the delay lines. The signal is supplied to the high impedance base inputs of the transistors 13, 14, 15 from the three tapping points of the delay path. The transistors 13 and 14 are connected as an emitter follower and simply serve as impedance converters. The transistors 15 and 16 simultaneously form the summing stage 4 and the integrator 5. The co-efficients K1 and K2 most suitable for the signal equalisation are adjustable independently of each other since the signal currents flowing through the adjusting resistors reach the low impedance emitter input of the transistor 16 via the coupling capacitor 18. The signal currents corresponding to the co-efficients K1 and K2 are supplied to the integrating capacitor 17 without any change of polarity. The collector of the transistor 16 thereby serves as a high impedance current source. The signal current from the central tap of the delay path is fed to the capacitor 17 via the transistor 15 serving as a high impedance current source with a polarity reversal. The interconnection of the collectors of transistors 15 and 16 together with the capacitor 17 provides a virtually ideal integrator which is only lightly loaded by the input of the emitter follower 23. A degenerative feedback, which is accomplished by the voltage divider 20, 21 and the capacitor 22, is required for the stabilisation of the voltage at the collectors of the transistors 15 and 16. The time constant of the degenerative feedback circuit, which may not be too large for reasons of stability, determines how quickly the amplitude of the integrated signal S3 falls to the average signal value.

For signals having pronounced low frequency spectral components, the eye opening is reduced, and thus the susceptibility to interference increased, due to the drop in amplitude. A current, which compensates to a large extent the fall in amplitude at the integrating point 15, 16, 17, is supplied to the integrator via the feedback high pass filter 9 in accordance with the invention. In this way, the eye opening is effectively enlarged so that interference signals will have a correspondingly lesser effect at the input of the zero crossing detector during the amplitude detection. The circuit concept in accordance with FIG. 1, which is also utilised in FIG. 3, permits the improvement of the signal equalisation provided by the invention to be realised with very little additional expenditure since the summing stage 4 of the cosine equaliser can be utilised for the supply of the signal fed back from the detector output via the high pass filter 9.

I claim:

1. A signal regenerator for binary signals comprising:

a cascade connection including, in the order recited, of an input filter, an integrator, an amplitude detector having a first output terminal and a period detector having a second output terminal; and high pass filter means for feeding the output signal, coupled between said first output terminal and a point in said cascade connection prior to said integrator for applying a portion of signal available at said first output terminal to said cascade connection, said output terminal being coupled to a summation circuit arranged between said input filter and said integrator.

2. The signal regenerator of claim 1 wherein said high pass filter includes a series connection of a resistor and a capacitor.

3. The signal regenerator of claim 1 further including means for matching an amplitude of the input signal amplitude to an amplitude of said fed back output signal.

4. The resignal generator of claim 1 wherein said input filter is a high pass filter.

\* \* \* \* \*